(12) United States Patent
Canal et al.

(10) Patent No.: US 8,739,536 B2
(45) Date of Patent: Jun. 3, 2014

(54) REGULATING THE TEMPERATURE OF A HEAT REGENERATOR USED IN AN INSTALLATION FOR STORING ENERGY BY ADIABATIC COMPRESSION OF AIR

(75) Inventors: Patrick Canal, Vincennes (FR); Lionel Nadau, Paris (FR)

(73) Assignee: GDF Suez, Paris (FR)

( * ) Notice: Subject to any disclaimer, the term of this patent is extended or adjusted under 35 U.S.C. 154(b) by 378 days.

(21) Appl. No.: 13/378,576

(22) PCT Filed: Jun. 14, 2010

(86) PCT No.: PCT/FR2010/051178
§ 371 (c)(1),
(2), (4) Date: Dec. 15, 2011

(87) PCT Pub. No.: WO2010/146292
PCT Pub. Date: Dec. 23, 2010

(65) Prior Publication Data
US 2012/0085087 A1 Apr. 12, 2012

(30) Foreign Application Priority Data
Jun. 18, 2009 (FR) ...................................... 09 54102

(51) Int. Cl.
*F01K 25/02* (2006.01)
*F01K 1/00* (2006.01)
*F28D 17/00* (2006.01)

(52) U.S. Cl.
USPC .................. 60/650; 60/652; 60/659; 60/682; 165/6; 165/10

(58) Field of Classification Search
USPC .............. 60/650, 652, 659, 682; 165/4, 6, 10
See application file for complete search history.

(56) References Cited

U.S. PATENT DOCUMENTS

| 2,341,638 | A | * | 2/1944 | Martinka | ........................ 60/659 |
| 3,677,008 | A | | 7/1972 | Koutz | |
| 3,872,673 | A | | 3/1975 | Margen | |
| 4,147,204 | A | | 4/1979 | Pfenninger | |
| 4,150,547 | A | | 4/1979 | Hobson | |
| 4,506,726 | A | * | 3/1985 | Tsai | ............................... 165/9.3 |
| 4,876,986 | A | * | 10/1989 | Johnson | ..................... 122/20 B |
| 7,926,276 | B1 | * | 4/2011 | Dunn | .............................. 60/682 |
| 7,951,339 | B1 | * | 5/2011 | Dunn | ............................ 422/207 |
| 2008/0050306 | A1 | * | 2/2008 | Keller et al. | ............... 423/574.1 |

* cited by examiner

*Primary Examiner* — Hoang Nguyen
(74) *Attorney, Agent, or Firm* — The Webb Law Firm

(57) ABSTRACT

The invention relates to a method of regulating the temperature of a heat regenerator (ST1, ST2) used in an installation (10) for storing energy by adiabatic compression of air. The regenerator is subjected to successive operating cycles, each cycle comprising a compression stage followed by an expansion stage. Between two successive cycles, the method consists in cooling a bottom compartment (26a) of the layer of refractory material (26) of the regenerator that is situated in the proximity of the bottom distribution box (24) in order to bring the air leaving the heat regenerator to a temperature that is compatible with the range of temperatures required during the compression stages. The invention also provides such a heat regenerator.

11 Claims, 2 Drawing Sheets

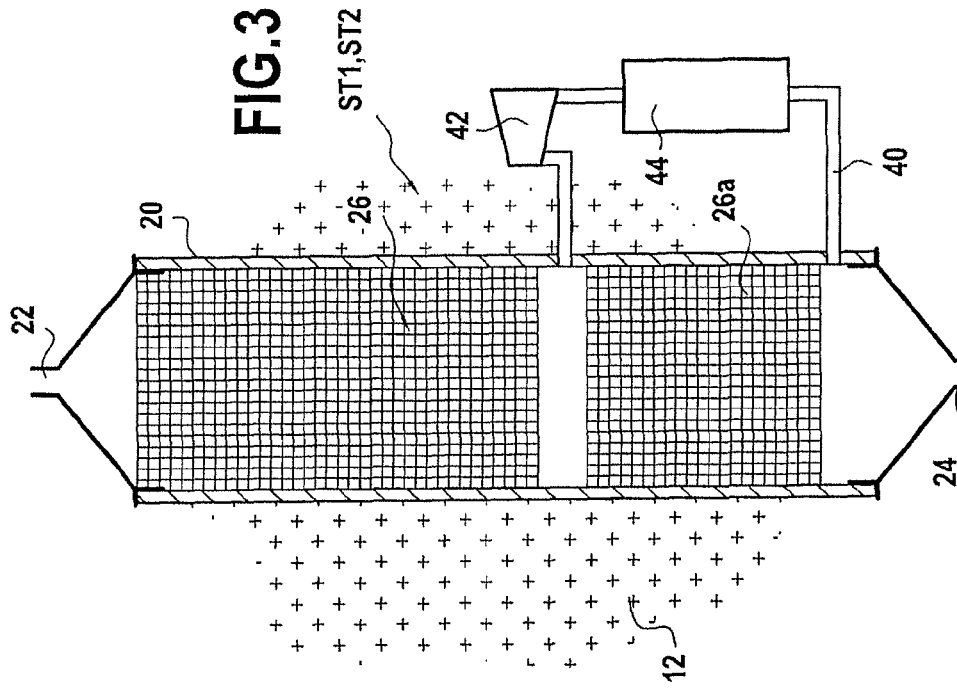
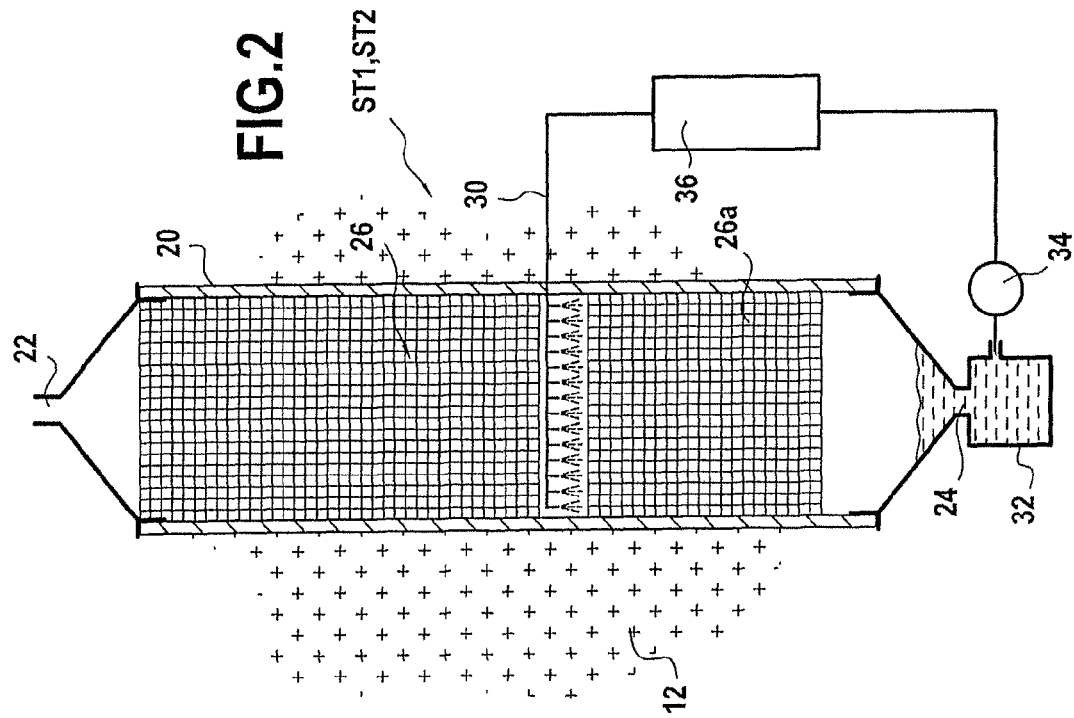

REGULATING THE TEMPERATURE OF A HEAT REGENERATOR USED IN AN INSTALLATION FOR STORING ENERGY BY ADIABATIC COMPRESSION OF AIR

BACKGROUND OF THE INVENTION

The present invention relates to the general field of mass storage of energy by compressing air. It relates more particularly to controlling the temperature of a heat regenerator used in an installation for storing energy by adiabatic compression of air.

Storing energy by compressing air consists in storing compressed air for subsequent use as a source of mechanical energy. Typically, the installations that are used for this type of energy storage are subjected to successive operating cycles, each operating cycle comprising a compression stage during which the air is compressed to high pressure and stored in a storage cavity, and an expansion stage during which electricity is produced by expanding the compressed air through air turbines driving alternators.

The principle of storing energy by compressing air is to take advantage of price differences for electricity between so-called "off-peak" hours during which electricity rates are less expensive, and so-called "peak" hours during which rates are more expensive. The energy-consuming compression stages are advantageously performed at lower cost during off-peak hours, while the electricity-producing expansion stages are performed during peak hours in order to supply electricity that is injected into electricity transmission networks when rates are more advantageous.

Various types of installation exist for storing energy by compressing air. Some such installations are said to be "diabatic" since they do not recover the heat that results from compressing air during the compression stages. As a result, they present relatively low electrical efficiency (less than 50%). They are also polluting since they eject $CO_2$ emissions that result from burning a fossil fuel, as is essential for preheating the air before it is sucked into the air turbines during the expansion stages. Such diabatic installations are therefore poor at satisfying the new European Community requirements concerning energy, economic, and environmental performance that require energy installations to be implemented that present high efficiency and that are environmentally friendly.

In order to mitigate those drawbacks, proposals have been made for installations that store energy by adiabatic compression of air (known as advanced adiabatic compressed air energy storage (AA-CAES)). That type of installation presents the feature of recovering the heat due to compression in reversible heat storage operating at high temperature. For this purpose, a heat regenerator forming part of the installation serves firstly to recover and store the heat energy generated by the compression—before the air is stored in the cavity—and secondly to restore this heat energy to the stream of expanding air in order to heat it before it is fed to the air turbine. Having recourse to a heat regenerator thus enables such installations to operate without $CO_2$ emissions and enables their electrical efficiency to be raised to more than 70%.

In such installations, the regenerator has the particularity of being subjected in alternation to the same stream of air that flows in one direction and then in the other: the stream of compressed air that passes through the regenerator during compression stages while yielding its heat energy is the same as the stream that passes therethrough in order to be heated during expansion stages that occur in alternation with the compression stages. Under such conditions, the temperature of the air at the outlet from the regenerator (in a compression stage) is influenced by the inlet temperature of the air during an expansion stage. Unfortunately, if the regenerator is not regulated efficiently, then the temperature of the air at the outlet from the regenerator during compression will increase progressively over successive operating cycles of the installation because the amount of energy extracted from the regenerator during the expansion stages does not compensate the quantity of heat stored during compression stages, in spite of heat losses through the walls. This temperature hysteresis is unacceptable since air temperatures above a critical threshold (about 50° C.) at the inlet to the storage capacity cannot be tolerated. Exceeding this threshold requires the operation of the installation to be stopped immediately on pain of rapidly degrading the organic layer in the storage capacity (by heating it excessively), or even of causing the steel involved in its design to buckle (by losing mechanical strength as a result of going beyond the limit for plastic deformation). Furthermore, progressive and irreversible overheating of the regenerator makes it impossible to perform any kind of control of its outlet temperatures.

As a result, a heat regenerator used in an installation for mass energy storage by adiabatic compression of air must perform two thermal functions. Firstly it must enable substantially all of the heat generated by the compressors to be stored under good conditions of thermodynamic reversibility. Secondly it must enable the outlet temperature of the air to be controlled so as to occupy narrow ranges (during both compression and expansion stages) in order to guarantee that the equipment (such as the compressors, the air turbines, and the storage cavity) continues to operate and remains unharmed.

OBJECT AND SUMMARY OF THE INVENTION

A main object of the present invention is thus to mitigate such drawbacks by proposing a method of regulating the heat regenerator that enables it to perform the two above-mentioned thermal functions effectively over a large number of operating cycles.

This object is achieved by a method of regulating the temperature of a heat regenerator used in an installation for storing energy by adiabatic compression of air, the heat regenerator comprising a layer of refractory material for storing sensible heat, which layer is arranged vertically between a top distribution box and a bottom distribution box, the heat regenerator being subjected to successive operating cycles, each operating cycle comprising a compression stage during which a stream of hot air penetrates into the regenerator via its top distribution box and passes right through the layer of refractory material in order to leave via the bottom distribution box after yielding its heat energy, followed by an expansion stage during which a stream of cold air penetrates into the regenerator via its bottom distribution box and passes right through the layer of refractory material in order to leave via the top distribution box after recovering its heat energy, the method being characterized in that it consists, between two successive operating cycles, in cooling a bottom compartment of the layer of refractory material that is situated in the proximity of the bottom distribution box in order to bring it to a temperature that is compatible with the required temperature range for air leaving the heat regenerator during the compression stages.

The invention provides for cooling the end of the heat regenerator at the ends of cooling stages and prior to subsequent compression stages (i.e. for cooling the portion of the refractory material that is situated close to the bottom distribution box), in order to bring the temperature of the refractory material to a temperature that is compatible with the required range of temperatures for the air leaving the heat regenerator during the compression stages. As a result, any drift in the temperature of the regenerator can be avoided and the thermodynamic equilibrium of the energy storage installation can thus be guaranteed over a large number of operating cycles, without any need to cool the entire mass of the layer of refractory material.

Furthermore, the fact of cooling the end of the heat regenerator between two successive cycles limits the amount of heat that needs to be removed to no more than the spread in the temperature profile over one cycle. In contrast, it has been found that cooling by means of an independent device (such as a heat exchanger) arranged at the outlet from the regenerator would require a larger amount of heat to be removed and would require greater volumes of refractory material in order to store the same quantity of heat. Compared with that solution, the invention thus makes it possible to reduce the quantity of heat required for regulating the heat regenerator, thereby increasing the thermal efficiency of the regenerator.

The bottom compartment of the layer of refractory material may be cooled by spraying a liquid at a temperature that is compatible with the required temperature range for the air leaving the heat regenerator during the compression stages. This embodiment presents the advantage that the water used also serves to clean this compartment of the heat regenerator.

Alternatively, the bottom compartment of the layer of refractory material is cooled by injecting a stream of air at a temperature that is compatible with the required range of temperatures for the air leaving the heat regenerator during the compression stages.

The invention also provides a heat regenerator for an installation for storing energy by adiabatic compression of air, the regenerator comprising a layer of refractory material for storing sensible heat, which layer is arranged vertically between a top distribution box for receiving a stream of hot air during compression stages and a bottom distribution box for receiving a stream of cold air during expansion stages, the regenerator being characterized in that it further comprises means for cooling a bottom compartment of the layer of refractory material that is situated in the proximity of the bottom distribution box in order to bring it to a temperature that is compatible with the required range of temperatures for the air leaving the heat regenerator during the compression stages.

The heat regenerator may include a liquid cooling circuit for cooling the bottom compartment of the layer of refractory material. Under such circumstances, the liquid cooling circuit may include a strip of liquid injectors arranged vertically above the bottom compartment of the layer of refractory material, a tank arranged level with the bottom distribution box of the regenerator in order to recover the injected liquid, a pump, and a heat exchanger for cooling the liquid coming from the tank.

Alternatively, the heat regenerator may include a gaseous cooling circuit for cooling the bottom compartment of the layer of refractory material. Under such circumstances, the gaseous cooling circuit may comprise an air duct opening out at its ends into the regenerator on either side of the bottom compartment of the layer of refractory material, a fan, and a heat exchanger for cooling the stream of air taken from beneath the bottom compartment of the layer of refractory material.

Furthermore, the bottom compartment of the layer of refractory material may extend vertically from the bottom distribution box up to a height that corresponds to about 10% of the total height of the layer of refractory material.

The invention also provides an installation for storing energy by adiabatic compression of air, the installation comprising at least one air compressor, a compressed air storage cavity connected to the compressor, and at least one air turbine connected to the storage cavity, the installation being characterized in that it includes at least one heat regenerator as defined above that is connected to the storage cavity, to the compressor, and to the air turbine.

BRIEF DESCRIPTION OF THE DRAWINGS

Other characteristics and advantages of the present invention appear from the following description made with reference to the accompanying drawings that show an implementation having no limiting character. In the figures:

FIG. 2 shows a heat regenerator in an embodiment of the invention;

FIG. 3 shows a heat regenerator in another embodiment of the invention; and

DETAILED DESCRIPTION OF EMBODIMENTS

Figure 1:
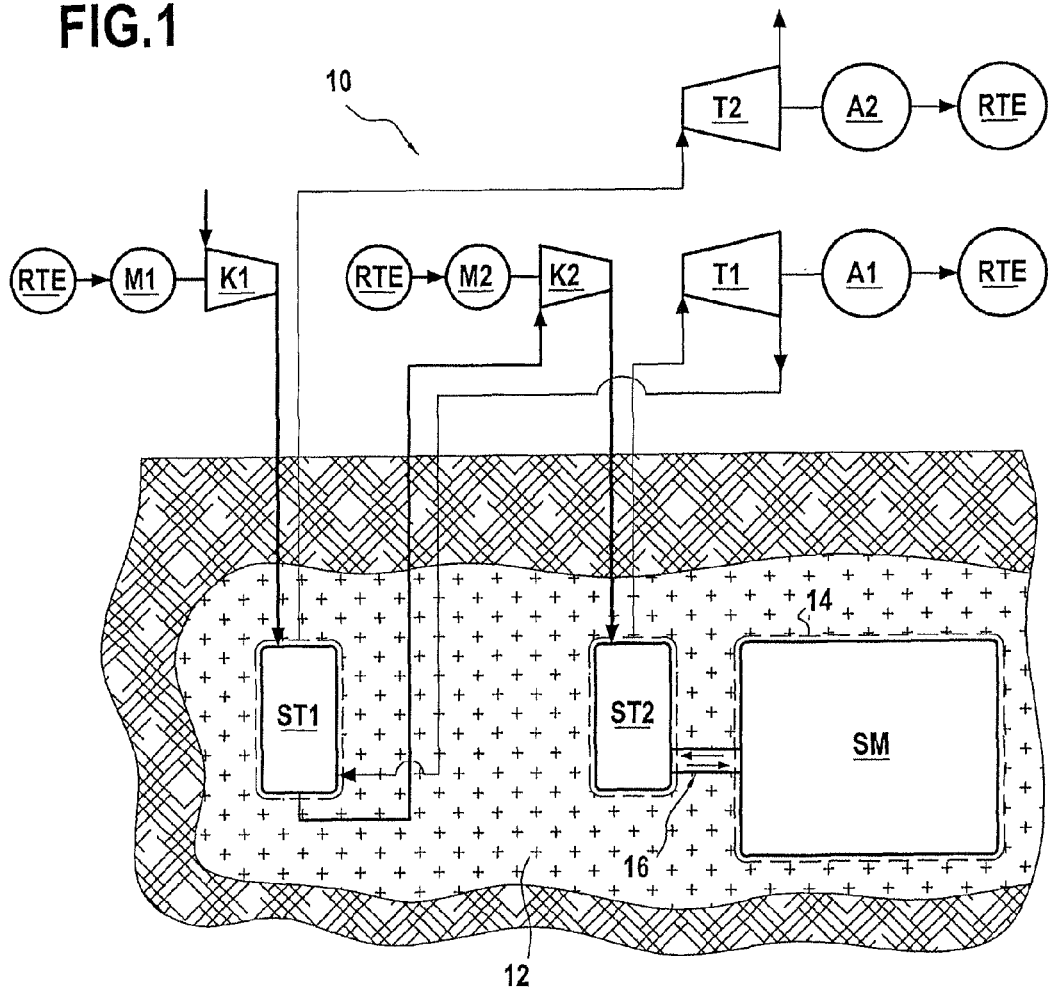
FIG. 1 is a diagrammatic view of an installation for storing energy by adiabatic compression of air, the installation being fitted with heat regenerators.

FIG. 1 is a highly diagrammatic view of an installation 10 for mass storage of energy (i.e. several gigawatts (GW) thermal) by adiabatic compression of air in accordance with the invention.

The invention 10 comprises one or more compression stages (there being two in FIG. 1, corresponding to a medium compression stage and a high compression stage) together with one or more expansion stages (there likewise being two in FIG. 1).

Each compression stage comprises an axial or a radial type compressor (i.e. a medium-pressure compressor K1 and a high-pressure compressor K2) driven by a respective electric motor M1 or M2, the motor being electrically powered from the electricity transmission network RTE. Similarly, each expansion stage comprises an air turbine T1, T2 connected to an alternator A1, A2 in order to deliver electricity to the electricity transport network RTE.

The installation 10 also has a lined excavated cavity SM in which the air compressed by the compressors K1 and K2 is stored under high pressure. In known manner, a lined excavated cavity, also known as a lined rock cavern (LRC), is a cavity constituted by an excavation dug out in compact rock 12 and having its walls provided with lining 14 suitable for withstanding high pressures in leaktight manner. This type of cavity constitutes an alternative to salt cavities, isolated water tables, and natural or artificial cavities, and it is particularly well adapted to storing air at high pressure in totally leaktight manner.

The installation 10 of the invention further comprises a heat regenerator for each compression/expansion stage (i.e. a medium-pressure regenerator ST1 and a high-pressure regenerator ST2). More precisely, the medium-pressure heat regenerator ST1 is interposed between the outlet from the medium-pressure compressor K1 and the inlet to the high-pressure compressor K2. It is also connected to the outlet from the air turbine T1 and to the inlet of the air turbine T2. The high-pressure heat regenerator ST2 is interposed between the outlet from the high-pressure compressor K2 and the feed duct 16 for feeding the excavated cavity SM. It is also connected to the inlet of the air turbine T1. The heat regenerators ST1 and ST2 are also buried in excavations dug out in the rock 12. Their structure is described below.

The operation of the installation 10 for storing energy by adiabatic compression of air can be understood in obvious manner from the above description. The installation is subjected to successive operating cycles, each operating cycle comprising a compression stage (preferably performed during off-peak periods for billing electricity), followed by an expansion stage (preferably performed during peak periods).

During the compression stage, the air follows the following path (bold lines in FIG. 1): the air is compressed by the medium-pressure compressor K1 up to a first pressure level (e.g. about 34 bars absolute at a temperature of about 570° C.). This compressed air then passes right through the medium-pressure regenerator ST1 within which the heat of compression is stored in sensible form. Once cooled, the compressed air is injected into the inlet of the high-pressure compressor K2 where it is compressed further. At its outlet, the air is compressed to high pressure (e.g. about 150 bars absolute at a temperature of 350° C.) and it passes right through the high-pressure regenerator ST2 in order to give off its heat energy which is stored in sensible form. The air compressed at high pressure is then stored at low temperature (in the range 5° C. to 60° C.) in the cavity SM, following the feed duct 16.

During the following expansion stage, the air follows the following path (fine lines in FIG. 1): the air compressed at high pressure in the cavity SM is reinjected into the high-pressure regenerator ST2 following the reverse path to the compression stage. The compressed air thus passes right through this high-pressure regenerator ST2 in which it recovers its heat energy that was stored therein. On leaving the high-pressure regenerator ST2, the compressed air as heated in this way is injected into the inlet of the air turbine T1 in order to produce electricity that is fed to the electricity transmission network RTE via the alternator A1. At the outlet from the air turbine T1, the compressed air is then sent to the medium-pressure regenerator ST1, which it passes right through in order to recover its heat energy. The air as heated in this way is then fed to the air turbine T2, which produces electricity that is likewise injected into the electricity transport network RTE (via the alternator A1).

With reference to FIGS. 2 and 3, there follows a description of the structure of the heat regenerators ST1 and ST2 of the energy storage installation.

Each regenerator ST1, ST2 comprises a substantially cylindrical shell 20 that is arranged vertically in an excavation dug out in the rock 12. At its top end, this shell presents a top distribution box 22 that receives a stream of hot compressed air during compression stages, and at its bottom end it has a bottom distribution box 24 that receives a stream of cold expanded air during expansion stages. The shell is also filled with a layer 26 of refractory material for the purpose of storing sensible heat, which layer is arranged between the distribution boxes 22 and 24, this layer possibly being arranged in a plurality of compartments. This layer 26 may for example be constituted by a stack of ceramic bricks that form flow channels. Other examples of layers of refractory material may naturally be envisaged (rock wool, refractory concrete, etc.).

During an operating cycle of the installation, the regenerators ST1, ST2 are subjected to particular stresses. It can be understood that an operating cycle as described above implies that the regenerators operate in a closed circuit (with the mass of air being constant between the compression stages and the expansion stages) such that it is difficult to achieve thermodynamic equilibrium.

Over continuing operating cycles of the installation, the fact that this thermodynamic equilibrium cannot be perfect leads to a drift in the temperature of the regenerators, thereby having the consequence of progressively raising the temperature at which air is outlet during compression stages.

In order to avoid such temperature drift, the invention makes provision during two successive operating cycles to cool (during a cooling stage) a bottom compartment (or portion) 26a of the layer of refractory material in each heat regenerator ST1 or ST2 so as to guarantee thermodynamic equilibrium and so as to remain within the required air temperature ranges at the outlets from the regenerators during compression stages (the bottom compartment 26a is a layer portion that is situated in immediate proximity of the bottom distribution box 24 of the regenerator).

To this end, in the embodiment of FIG. 2, each regenerator ST1, ST2 includes a liquid cooling circuit (e.g. using water) for cooling the bottom compartment 26a of the layer of refractory material.

This water cooling circuit comprises in particular a water injector strip 30 that is arranged vertically above the bottom compartment 26a of the layer of refractory material (this bottom compartment 26a is separated vertically from the remainder of the so-called "active" layer of refractory material that stores the heat energy from the compressors). A tank 32 arranged at the outlet from the bottom distribution box 24 of the regenerator ST1, ST2 serves to recover the water that has cooled the bottom compartment 26a of refractory material. The water cooling circuit also includes a pump 34 that is activated during the cooling stages and a heat exchanger 36 for cooling the water coming from the tank 32. More precisely, the heat exchanger 36 is connected to an external circuit implementing aero-coolers or to a supply of cold water (such as a lake or a reservoir).

The heat exchanger 36 is adjusted so as to obtain cooling of the bottom compartment 26a of refractory material to the required temperature. This temperature must be compatible with the temperature range required for air leaving the heat regenerator during compression stages. By way of example, it is slightly lower than the mean air outlet temperature during the compression stages.

FIG. 3 shows another way in which the cooling of the bottom compartment 26a of refractory material in the regenerators ST1 and ST2 may be implemented. In this implementation, each regenerator includes a gaseous circuit (e.g. using air) for cooling the bottom compartment 26a of refractory material.

This air cooling circuit comprises in particular an air duct 40 having its ends opening out into the regenerator ST1, ST2 on either side of the bottom compartment 26a of the refractory material layer, an air circulation fan 42 that is activated during the cooling stages, and a heat exchanger 44 for cooling the stream of air taken from the outlet of the bottom distribution box 24.

The heat exchanger 44 is adjusted to obtain cooling of the bottom compartment 26a of refractory material to the required temperature. This temperature must be compatible with the required temperature range for air leaving the heat regenerator during the compression stages.

It should be observed that the duration of the cooling stage (by spraying liquid or by cooling with gas) is associated with the quantity of heat that is to be dissipated, with the flow rate of water or air, and also with the inlet temperature of said water or air.

Whatever the cooling technique, the dimensioning of the bottom compartment 26a of the layer of refractory material that is cooled depends on numerous parameters. By way of example, it may extend vertically from the bottom distribution box 24 of the regenerator ST1, ST2 up to a height corresponding to about 10% of the total height of the layer 26 of refractory material.

Figure 4A:
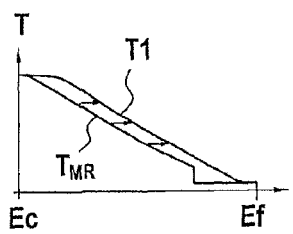
FIGS. 4A to 4C show temperature profiles of the heat regenerator of the invention during different stages.
Figure 4B:
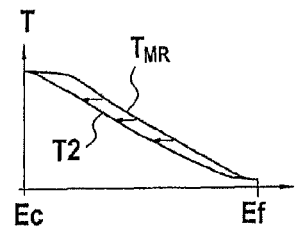
Figure 4C:
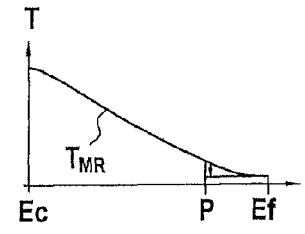

With reference to FIGS. 4A to 4C, there follows a description of the effect of the cooling stages on the temperature profile of the heat regenerator.

FIGS. 4A to 4C are curves plotting the temperature T of the stream of air passing right through the heat regenerator of the invention (between the top distribution box $E_C$ and the bottom distribution box $E_F$ thereof). These curves are obtained by simulations obtained after a certain number of operating cycles of the energy storage installation and based on one-dimensional dynamic modeling of the regenerator.

During the air compression stage (FIG. 4A), the temperature front $T_1$ of the stream of air passing through the regenerator (from the top distribution box $E_C$ to the bottom distribution box $E_F$) moves towards the bottom distribution box $E_F$ of the regenerator (relative to the profile $T_{MR}$ representing the temperature of the refractory material inside the regenerator). It should be observed that this movement of the temperature front does not happen en bloc but rather is additional to deformation generated by heat transfer delays and by heat diffusing longitudinally.

During the following stage of air expansion (FIG. 4B), the temperature front $T_2$ of the stream of air passing through the regenerator (from the bottom distribution box $E_F$ to the top distribution box $E_C$) returns to its initial position. Nevertheless, because of the above-mentioned deformation, the profile has become wider, such that the temperature level with the bottom distribution box $E_F$ of the regenerator does not return to its initial value.

Finally, the stage of cooling following the expansion stage (FIG. 4C) enables the temperature of the bottom compartment of refractory material in the regenerator to be returned to the desired value (the temperature profile corresponding to this portion is represented in FIG. 4C between points P and $E_F$).

Thus, the fact of cooling the bottom compartment of refractory material between two successive operating cycles of the energy storage installation limits the amount of heat that is removed to the spreading of the temperature front over a single cycle (the heat surplus that needs to be removed in order to obtain thermodynamically reversible operation of the regenerator). Furthermore, it can be seen from these curves in FIGS. 4A to 4C that cooling by means of an independent device (such as a heat exchanger) arranged at the outlet from the regenerator would have required heat to be removed in much greater quantity. The cooling as proposed by the invention thus presents overall thermodynamic efficiency that is greater insofar as the amount of heat to be removed is smaller.

The invention claimed is:

1. A method of regulating the temperature of a heat regenerator used in an installation for storing energy by adiabatic compression of air, the heat regenerator comprising a layer of refractory material for storing sensible heat, which layer is arranged vertically between a top distribution box and a bottom distribution box, the heat regenerator being subjected to successive operating cycles, each operating cycle comprising a compression stage during which a stream of hot air penetrates into the regenerator via its top distribution box and passes right through the layer of refractory material in order to leave via the bottom distribution box after yielding its heat energy, followed by an expansion stage during which a stream of cold air penetrates into the regenerator via its bottom distribution box and passes right through the layer of refractory material in order to leave via the top distribution box after recovering its heat energy, the method being characterized in that it consists, between two successive operating cycles, in cooling a bottom compartment of the layer of refractory material that is situated in the proximity of the bottom distribution box in order to bring it to a temperature that is compatible with the required temperature range for air leaving the heat regenerator during the compression stages.

2. The method according to claim 1, wherein the bottom compartment of the layer of refractory material is cooled by spraying a liquid at a temperature that is compatible with the required temperature range for the air leaving the heat regenerator during the compression stages.

3. The method according to claim 1, wherein the bottom compartment of the layer of refractory material is cooled by injecting a stream of air at a temperature that is compatible with the required range of temperatures for the air leaving the heat regenerator during the compression stages.

4. A heat regenerator for an installation for storing energy by adiabatic compression of air, the regenerator comprising a layer of refractory material for storing sensible heat, which layer is arranged vertically between a top distribution box for receiving a stream of hot air during compression stages and a bottom distribution box for receiving a stream of cold air during expansion stages, the regenerator being characterized in that it further comprises means for cooling a bottom compartment of the layer of refractory material that is situated in the proximity of the bottom distribution box in order to bring it to a temperature that is compatible with the required range of temperatures for the air leaving the heat regenerator during the compression stages.

5. The heat regenerator according to claim 4, including a liquid cooling circuit for cooling the bottom compartment of the layer of refractory material.

6. The heat regenerator according to claim 5, wherein the liquid cooling circuit includes a strip of liquid injectors arranged vertically above the bottom compartment of the layer of refractory material, a tank arranged level with the bottom distribution box of the regenerator in order to recover the injected liquid, a pump, and a heat exchanger for cooling the liquid coming from the tank.

7. The heat regenerator according to claim 4, including a gaseous cooling circuit for cooling the bottom compartment of the layer of refractory material.

8. The heat regenerator according to claim 7, wherein the gaseous cooling circuit comprises an air duct opening out at its ends into the regenerator on either side of the bottom compartment of the layer of refractory material, a fan, and a heat exchanger for cooling the stream of air taken from beneath the bottom compartment of the layer of refractory material.

9. The heat regenerator according to claim 4, wherein the bottom compartment of the layer of refractory material extends vertically from the bottom distribution box up to a height that corresponds to about 10% of the total height of the layer of refractory material.

10. An installation for storing energy by adiabatic compression of air, the installation comprising at least one air compressor, a compressed air storage cavity connected to the compressor, and at least one air turbine connected to the storage cavity, the installation being characterized in that it includes at least one heat regenerator according to claim 4 that is connected to the storage cavity, to the compressor, and to the air turbine.

11. The installation according to claim 10, including a medium-pressure heat regenerator connected to medium- and high-pressure compressors and to two air turbines and a high-pressure heat regenerator connected to the high-pressure compressor, to one of the air turbines, and to the storage cavity.

* * * * *